J. C. CARPENTER.
CLUTCH AND TRANSMISSION MECHANISM.
APPLICATION FILED DEC. 18, 1908.
947,295.  Patented Jan. 25, 1910.
2 SHEETS—SHEET 1.
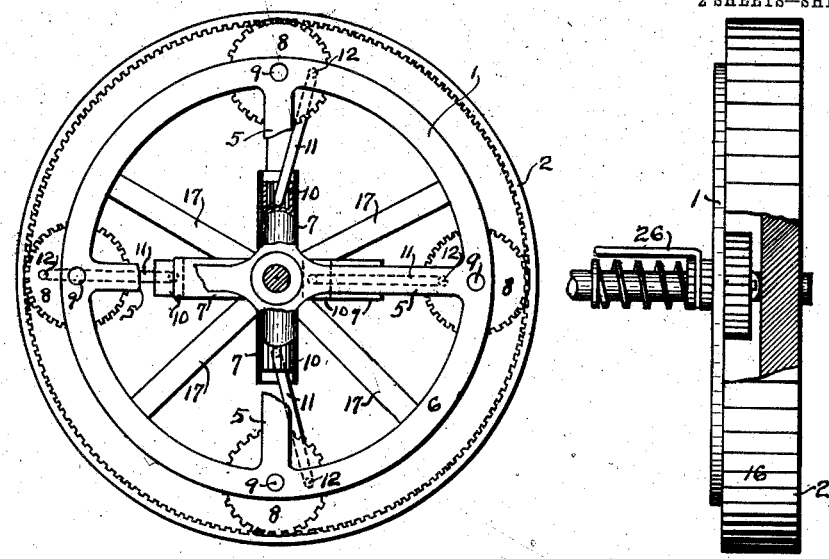
Fig. 1.   Fig. 2.
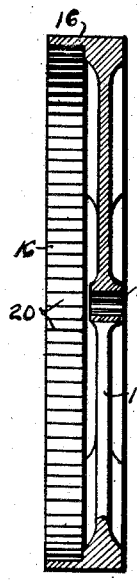
Fig. 3.
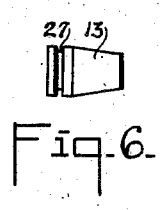
Fig. 6.   Fig. 8.
Fig. 9.
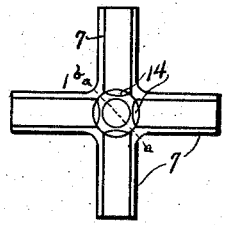
Fig. 7.
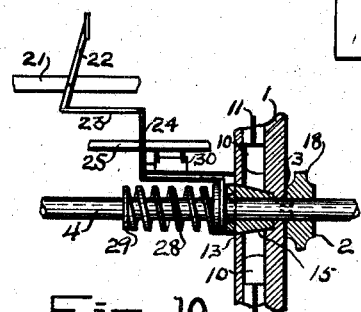
Fig. 10.
WITNESSES:
Ernest C. ...
LaVena Miller
INVENTOR
John C. Carpenter
BY
Edward V. Hardaway.
ATTORNEY J. C. CARPENTER.
CLUTCH AND TRANSMISSION MECHANISM.
APPLICATION FILED DEC. 18, 1908.
947,295.
Patented Jan. 25, 1910.
2 SHEETS—SHEET 2.
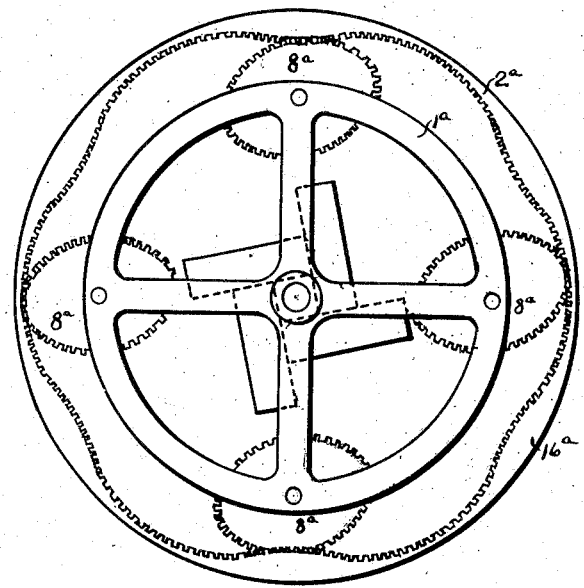
Fig. 4.
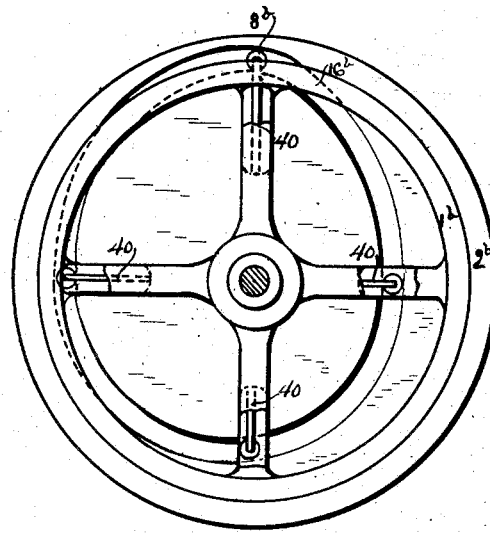
Fig. 5.
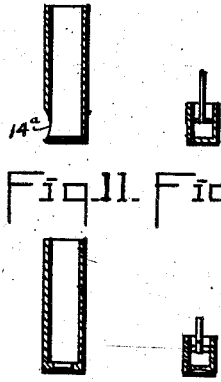
Fig. 11.  Fig. 13.
Fig. 12.  Fig. 14.
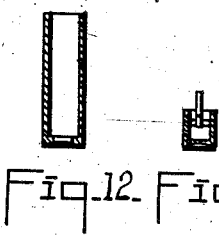
Fig. 15.
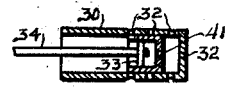
Fig. 16.
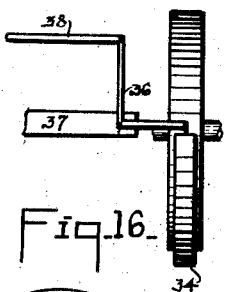
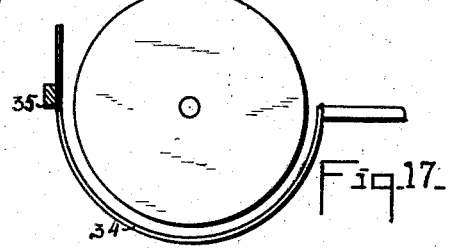
Fig. 17.
WITNESSES:
INVENTOR
John C. Carpenter
BY
Edward V. Hardway
ATTORNEY

UNITED STATES PATENT OFFICE.

JOHN C. CARPENTER, OF HOUSTON HEIGHTS, TEXAS.

CLUTCH AND TRANSMISSION MECHANISM.

947,295.      Specification of Letters Patent.      Patented Jan. 25, 1910.

Application filed December 18, 1908. Serial No. 468,208.

*To all whom it may concern:*

Be it known that I, JOHN C. CARPENTER, a citizen of the United States, residing at Houston Heights, in the county of Harris and State of Texas, have invented certain new and useful Improvements in Clutch and Transmission Mechanism, of which the following is a specification.

My invention relates to new and useful improvements in clutch and transmission mechanism and more particularly to that class of such devices as are fluid controlled.

The accompanying drawings illustrate the application of this device to automobiles.

The object of the invention is to provide a device of the character described that will obviate the two prime defects of the clutches now in use, to wit.: the tendency to transmit power, not gradually, but with a jerk, thus jarring the machinery and also the tendency of the friction surfaces to become worn and slip on each other, thus causing a loss of power and an unpleasant and injurious vibration of the machinery.

Another feature resides in the provision of means, whereby the engagement of the two members of the clutch is controlled by the passage of a fluid, usually air, under compression, suction or both, into, or out of a cylinder mounted on one of said members, through a port which is opened or closed by manually operated means.

A further feature resides in the provision of means for preventing the clutch from being suddenly engaged, as will be, hereinafter, accurately set forth and described.

A still further and important object of this invention is to provide for the communication of rotation from the driving to the driven mechanism without the necessity of shifting the change speed mechanism other than from neutral to reverse or to high speed, except under great load, thereby enabling the driver of the automobile to operate it at all speeds and under substantially all loads, with the motor running at its maximum speed efficiency, thus giving a greater degree of flexibility to the operation of the engine.

A still further feature of my invention resides in the provision of a mechanism for retarding the revolution of the driven clutch member, when the clutch is disengaged, so that the number of revolutions performed by the driven member, may be so reduced as to allow the transmission gears to be shifted without clashing, thus avoiding shock to the driven mechanism.

A still further feature of this invention resides in the construction of the head ends of the cylinder and piston, so that they conform to the surface of the valve, whereby the piston clearance is reduced to a minimum and pressure increased to the maximum.

Finally the object of my invention is to provide a device of the character described, that will be strong, durable, light and efficient and one that will be easily constructed and kept in repair.

With the above and other objects in view, my invention has particular relation to certain features of construction and operation, an example of which is described in this specification, which I do declare to be a full, clear and exact description of the invention, reference being had to the accompanying drawings and the figures and letters of reference marked thereon, wherein:

Figure 1 is a side elevation of my device. Fig. 2, is an edge view thereof, showing the relation of the driving and driven members, with a portion of the driven member broken away. Fig. 3, shows a sectional view of the driven member. Figs. 4 and 5, show modified forms of the device as shown in Fig. 1. Fig. 6, is a side view of the conical shaped valve, which is also shown, in a modified form in Fig. 7. Fig. 8, is a sectional view of the cylinders which are carried by the driving member with the valve removed. Fig. 9 is a sectional view of the cylinders, taken on the line $a-a$ of Fig. 8. Fig. 10, is a partial sectional view of the assembled parts, showing the valve in the position it will occupy when the clutch is engaged, and showing, also, partially, the means for controlling the operation of the device. Figs. 11 and 12, show two forms of the cylinders in detail and Figs. 13 and 14 show the pistons for said cylinders respectively. Fig. 15, is a sectional view of the dash-pot. Figs. 16 and 17, are two views of the brake for controlling the driven member.

Referring now more particularly to the drawings, wherein like characters of reference designate similar parts in all of the figures, the numeral 1, in Figs. 1, 2, and 10 designates the driving member, and in said figures the numeral 2 refers to the driven member, a sectional view of which is shown in Fig. 3. In my preferred form of the invention the driving member comprises a bearing 3, by which it is rigidly held on drive shaft 4, and from which radiate spokes or braces 5, and a rim 6 which is circular in form, and which is integral with, or rigidly attached to said spokes 5, at their outer extremities. This driving member carries, preferably a plurality of cylinders 7, which form the bearing of the member as shown. These cylinders may be individual, or they may be joined together as a unit as shown in Fig. 8, and, for strength, should be integral with the bearing 3, which is a flat plate of metal, circular shape and of a sufficient diameter to form a substantial support for said cylinders. The rim 6 carries one or more, preferably four pinions 8, one for each cylinder or piston. These pinions revolve in bearings 9 in said rim, are equal in size and are similarly gear toothed. Each of the cylinders 7 is provided with a piston 10, designated to operate therein, and carrying a connecting rod 11, which has engagement, also with its pinion, either through a crank or merely a wrist pin 12, in the ordinary manner. The driving shaft 4, which transmits motion from the engine to the driving member, carries a valve 13, slidably mounted thereon. This valve has the shape of a conical frustum, preferably, with a longitudinal, cylindrical, opening therethrough, provided for the reception of shaft 4. The shape of this valve may be varied and may be cylindrical, prismatic, conoidal, or may have the shape of a pyramidal frustum. The inner ends of the cylinders 7, are provided with ports 14, which are equal in diameter, to the full diameter of the cylinders themselves. These ports open into a recess 15, shaped like the valve 13, and of such a size that the said valve will fit snugly therein. This recess extends beyond said cylinders and into the bearing member 3, as shown in Fig. 8. As this valve is forced into said recess, the ports 14 are gradually closed and an air cushion gradually formed in the cylinders 7, and when the valve is fully driven into the recess, the ports are entirely closed and a permanent cushion, thereby formed, which holds the pistons 10 against any material movement, but at the same time gives them an elastic base. These pistons are so shaped at their inner ends, as to conform to the shape of that portion of the valve against which they rest at full stroke, so as to fit closely thereagainst and to avoid all clearance therebetween. When the driving member carries four cylinders, they preferably extend at right angles to each other and each wrist pin 12 is located on respective pinions, at a point 180° distant from the point corresponding to the point of location of the wrist pin on the oppositely disposed pinion.

The driven member 2 comprises the rim 16, spokes 17 and bearings 18. It is mounted upon a shaft 19, Fig. 10, through which it communicates motion to the driven machinery. In one form of the clutch described herein the rim of this member overhangs the spokes on the driving member side thereof, as shown in Fig. 3 and this overhanging portion is provided with an annular spur gear 20, with which the pinions 8 engage.

In Fig. 10, the numeral 21, designates a portion of the footboard of an automobile and 22 a foot lever. This lever is pivoted to said foot board and at its lower end is hingedly attached to connecting rod 23 which is in turn hinged to lever 24, pivoted to support 25. Lever 24 is hingedly attached at its lower extremity to yoke 26, the fingers of which are designed to engage in an annular groove 27, provided for that purpose, in valve 13. By a forward pressure upon foot lever 22, the valve will be drawn out of its engagement with the driving member, through the operation of the levers, connecting rod, and yoke just described; and when the pressure of said foot lever is released the valve 13 is forced back into recess 15, provided for it, by the action of coil spring 28 which is carried by shaft 4 and which rests against shoulder 29 carried by said shaft, by means of which it is held in resistance against said valve. When the pressure on foot lever 22 is released, the spring 28 tends to force valve 13, suddenly into recess 15, and consequently, to suddenly close the ports to the cylinders. To prevent this sudden closing of said ports, an "air cushion" in the form of a dashpot, 30, as shown in detail in Fig. 15, is provided. This checking device comprises a cylinder 31, carried on support 25, provided with a plurality of inlets and outlets 32, and a piston 33. A piston rod 34 connects this piston with lever 24 in such a manner that when the foot lever is released, the movement of lever 24 and, consequently, of valve 13, will be gradual, rather than sudden, by reason of the resistance of the air in cylinder 30, against piston 33. This air gradually escapes through outlets 32, until the valve 13 seats in recess 15 and closes ports 14. Where this piston 33 is reversed the check valve 41 opens which is sufficiently large to admit air enough to prevent a partial vacuum in cylinder 31. This arrangement permits the clutch to be disengaged suddenly.

A band brake 34 is provided for the purpose of retarding the revolution of the driven member when the clutch is disengaged and when it is intended to change from neutral or from a lower to a higher gear, so that the speed of the said member may be so reduced as to allow a change of gear transmission without a shock to the driven mechanism. One end of this brake is hinged to support 35 and the other end is attached to one arm of bell crank 36, which is pivoted to support 37. To the other arm of this crank a connecting rod 38 is hingedly attached, which rod is attached at its other end to lever 24 so that, when the foot lever is pressed forward a partial movement releases the clutch and a further movement sets the brake.

Fig. 4 shows a modified form of the invention wherein 1$^a$ is the driving member and 2$^a$ is the driven member. In this figure, the cylinders are shown tangentially, arranged, with reference to the axis of rotation, which arrangement allows a longer stroke to the pistons. The cylinders may also be arranged radially, with reference to said axis, if so desired. In this form of the clutch, the pinions 8$^a$ are elliptical in form. This form of pinion gives to the clutch the advantage, that with the piston radially attached, the piston connecting rod being parallel to the shortest diameter of said pinions, the connecting rod movement is accelerated at the dead centers and retarded between dead centers, thus making the resisting force of the fluid, more regular with reference to the relative movement of the driven member. It is to be observed that the internal or geared portion of the overhanging rim 16$^a$, is regularly undulating or reversibly curved. The number from one crown to its next succeeding crown being exactly one-half of the number of cogs in each pinion and the pinions are so disposed that the side of each pinion will coincide with each crown in passing around the rim 16$^a$, and it is to be further observed that the oppositely disposed pinions always occupy the same relative position with reference to driving member 1$^a$.

Fig. 5, shows another form of my invention, wherein 1$^b$ is the driving member and 2$^b$ the driven member. In this form of the clutch, the cylinders may be arranged radially or tangentially with reference to the axis of rotation, as is desired. In this form of the clutch, the driven member is provided with a circular groove 16$^b$, eccentric to the axis of rotation and the cylinders of the driving member carry pistons and piston rods as in the forms shown in Figs. 1 and 4. The piston rods, in this form, however, carry at their ends, studs 8$^b$, in lieu of the pinions, shown in Figs. 1 and 4, said studs being rotatably attached to said piston rods and being disposed at right angles thereto, and projecting into said grooves 16$^b$. The piston rods which carry the studs 8$^b$ are held against internal movement in their proper relation to the driving member by means of stays 40.

In case the cylinders are arranged tangentially to the axis of rotation, the ports may be in the side of said cylinder as shown in Fig. 11, 14$^a$ or they may be at the ends thereof as shown in Fig. 8. In the latter case the valve should be provided with gates 39 Fig. 7, equal in number to the number of cylinders carried by the driving member and arranged with reference to the valve, similarly to the arrangement of the cylinder with reference to the valve recess 15. These gates 39 are designed to fit closely against the port ends of the cylinders and to tightly close the ports.

The principal construction and mode of operation of the forms of the invention as illustrated in Figs. 4 and 5 are, in all respects, similar to those of the form illustrated in Fig. 11 with the exceptions already pointed out, illustrated and explained.

While I have shown the driving member in Figs. 1, 2, 3, and 4, annularly or internally geared, I desire to state that this member may be externally geared, by making a corresponding change in the arrangement of the piston rod and pinions carried by the driven members. It is also possible to reverse the members and make the one which is shown in Figs. 1, 2, 3, and 4, as the driving member, the driven member.

Having described my invention and designated its individual parts, I will now describe its principle and mode of operation.

When the engine is running and the driving member shown in Fig. 1, is rotating, if the valve 13 is disengaged, pistons 10 will meet with no resistance; and the ports 14 will be fully open for the free passage of the air or other fluid and the pinions 8 will merely rotate around the gear of the driven member without imparting any motion to said member. When the valve 13 is released by the operation of foot lever 22, the spring tends to force said valve into recess 15 and close the cylinder ports. This action of said spring is made gradual by means of the air cushion 30 as hereinbefore described, and the ports become partially closed, the atmosphere in the cylinders unable to readily escape, becomes partially compressed and thereby offers resistance to movement of pistons 10 which resistance is transformed into friction between the said pinions and the gear teeth of the driven member and a consequent rotative movement is imparted to said driven member. This rotative motion is imparted to the driven machinery through any suitable means. When the valve is forced entirely into recess 15 by the action of spring 28 and ports 14 are entirely closed, the rotation of the pinions is entirely stopped and the driven member is forced to rotate with the driving member, the compressed air in the cylinder, or the atmospheric pressure on the piston carried by a vacuum in the cylinder, giving the effect of a cushion between the pistons and cylinders and therefore between the driving and driven members. When it is desired to disengage the clutch the valve may be withdrawn by the operation of foot lever 22 as herein before set forth and by a complete disengagement of the clutch the band brake may be set on the driven member, through the operation of rod 39 and crank 36, and the rotation of said member thereby reduced so as to permit a change of gear without a jar to the machinery.

The operation of the forms of the invention shown in Figs. 4 and 5, is essentially the same as that of the form shown in Fig. 1 with such differences as would readily be inferred from the difference in the detailed construction as hereinbefore pointed out.

Another form of my clutch, which may be used without departing from the spirit of the invention, may be constructed by reversing the cylinders on the member carrying the same, end for end, attaching the piston connecting rod to a crank arm, a yoke block, or an equivalent of either, carried by the driving shaft of the other member and providing suitable valves, whose operation is controlled substantially as the operation of those illustrated in the drawings, whereby the outward or open ends of the cylinders may be closed.

What I claim is:—

1. In a fluid clutch, the combination of a rotary clutch member, having a groove eccentric to the axis of rotation, a second clutch member supporting a cylinder, a piston in said cylinder, the end of which piston engages the faces of said eccentric groove, a port in said cylinder opening to the atmosphere, a valve for said port, and means for permitting the flow of fluid through said port, causing the piston to reciprocate in the cylinder under the action of the eccentric surfaces of said groove, whereby the clutch will run idle, and means for preventing the flow of said fluid through said port, whereby the piston is locked in unyielding engagement with the said faces of said eccentric groove, whereby both members are forced to rotate together.

2. In a fluid clutch mechanism, the combination of a rotary clutch member having a groove eccentric to the axis of rotation, a second clutch member supporting a cylinder, a piston in said cylinder, the end of which piston engages the faces of said eccentric groove, a port in said cylinder, means for permitting the flow of fluid through said port, causing the piston to reciprocate in the cylinder under the action of the eccentric surfaces of said groove, whereby the clutch will run idle, and means for preventing the flow of fluid through said port, whereby the piston is locked in engagement with the said eccentric surfaces of said groove, whereby both members are forced to rotate together.

3. A clutch, comprising a driving and a driven member; a cylinder mounted on one of said members, said cylinder being substantially a hollow cylinder open at both ends and having the head end opening unrestricted, a valve to control the head end opening of said cylinder, means connected with said valve for preventing automatically the sudden closing of said valve, manually operated means also having connection with said valve and so arranged as to permit said valve to be suddenly opened, a piston mounted on said cylinder-carrying member, reciprocating in said cylinder and having connection with means for engaging the other member, the head end of said piston conforming to the surface of said valve and adapted to approach closely thereto.

4. In a power transmitter, the combination with a driving and a driven member having a common axis of rotation; of a plurality of cylinders carried by one of said members and radially disposed thereon; a port in each cylinder; a piston arranged in each cylinder and adapted to reciprocate therein and, at head center, to fill the port thereof, which is unrestricted; a common means, concentric with said axis of rotation, for controlling the passage of fluid through said ports, simultaneously; means for connecting the said pistons with the other of said members; means for connection with said controlling means and so arranged as to automatically control the same, and manually operated means for also controlling said controlling means.

5. The combination in a clutch, of a driving member and a driven member, a cylinder and a piston mounted on one of said members, a port in said cylinder, a valve for said port, means having connection with said piston for engaging the other of said members, an external contracting friction band concentric to the driven member, means for controlling the action of said valve whereby said clutch may run idle or the members thereof be brought into rigid engagement, the said valve controlling means also operating the said friction band, whereby, when the said valve is open, the said band will contact with the driven member and the rotation of said member will be retarded.

6. In a fluid clutch mechanism, the combination with a driving and a driven member of a cylinder mounted on one of said members, a port in said cylinder, a valve for said port, said valve being concentric to the axis of rotation of said members and being slidable upon a shaft concentric with said valve and with said axis of rotation, a piston mounted on said cylinder carrying member and reciprocating in said cylinder, means for connecting said piston with means for engaging with the other of said members, and means for operating said valve to admit of the inlet and outlet of fluid to and from said cylinder, and thus control the operation of said piston.

7. In a clutch and transmission mechanism, the combination of a chamber having a fluid port; a movable fluid displacing member acting within said chamber; driving and driven members operatively connected, one with said chamber and the other with said fluid displacing member; a sliding valve for said port; a valve seat; a guide for said valve, said guide being inclined toward said valve seat.

8. In a clutch and transmission mechanism, the combination of a chamber having a fluid port; a movable fluid displacing member acting within said chamber; driving and driven members operatively connected, one with said chamber and the other with said fluid displacing member; a sliding valve for said port; a valve seat; a guide for said valve, said guide and the face of said valve being inclined toward each other.

9. In a clutch and transmission mechanism, the combination of a chamber having a fluid port; a movable fluid displacing member acting within said chamber; driving and driven members operatively connected, one with said chamber and the other with said fluid displacing member; a sliding valve for said port; a valve seat; a guide for said valve, said guide and the face of said valve being inclined toward each other; means constantly tending to close said valve, and manual means for opening said valve and for permitting the last-mentioned means to close the same.

10. In a clutch and transmission mechanism, the combination of a chamber having a fluid port; a movable fluid displacing member acting within said chamber; driving and driven members operatively connected, one with said chamber and the other with said fluid displacing member; a sliding valve for said port whose face is inclined toward its line of travel, and manual means for controlling said valve.

In testimony whereof I have signed my name to this specification in the presence of two subscribing witnesses.

JOHN C. CARPENTER.

Witnesses:
 ERNEST C. GUY,
 LA VERA MILLER.